US008991569B1

(12) United States Patent
Lou et al.

(10) Patent No.: US 8,991,569 B1
(45) Date of Patent: Mar. 31, 2015

(54) STRUT WITH ADAPTIVE ENERGY ATTENUATION

(71) Applicant: Armorworks Enterprises, LLC, Chandler, AZ (US)

(72) Inventors: Ken-An Lou, Phoenix, AZ (US); Richard E. Zimmermann, Tempe, AZ (US); Ernest J Racette, Phoenix, AZ (US)

(73) Assignee: Armorworks Enterprises LLC, Chandler, AZ (US)

( * ) Notice: Subject to any disclaimer, the term of this patent is extended or adjusted under 35 U.S.C. 154(b) by 163 days.

(21) Appl. No.: 13/676,751

(22) Filed: Nov. 14, 2012

Related U.S. Application Data

(60) Provisional application No. 61/560,345, filed on Nov. 16, 2011.

(51) Int. Cl.
*F16D 57/02* (2006.01)
*F16F 9/50* (2006.01)
*B60N 2/427* (2006.01)
*F16F 13/00* (2006.01)

(52) U.S. Cl.
CPC . *F16F 9/50* (2013.01); *B60N 2/427* (2013.01); *F16F 13/007* (2013.01)
USPC ..................................................... 188/266.5

(58) Field of Classification Search
CPC ........ B60R 21/18; B60R 22/02; B60R 22/16; B60R 22/18; B60R 22/22; B60R 22/26; B60R 22/28; B60R 22/105; B60R 22/341; F16F 7/123; B60N 2/2812; B60N 2/4242; B60N 2/4249; B60N 2/42709; A47D 15/006
USPC ......................... 188/266.2, 282.1, 282.2, 266; 267/140.13; 297/471, 472, 484, 216.1, 297/216.13, 216.14, 216.16, 216.17
See application file for complete search history.

(56) References Cited

U.S. PATENT DOCUMENTS

| | | | |
|---|---|---|---|
| 4,531,699 A * | 7/1985 | Pinson | 248/550 |
| 5,078,239 A * | 1/1992 | Kobayashi et al. | 188/280 |
| 5,652,704 A | 7/1997 | Catanzarite | |
| 6,095,486 A | 8/2000 | Ivers et al. | |
| 6,695,102 B1 | 2/2004 | Marjoram et al. | |
| 6,942,204 B2 | 9/2005 | Wolf et al. | |
| 7,921,973 B2 | 4/2011 | Wereley et al. | |
| 8,162,374 B2 | 4/2012 | Cantor et al. | |
| 2006/0225976 A1* | 10/2006 | Nakadate | 188/266 |
| 2007/0251776 A1* | 11/2007 | Braun | 188/266 |
| 2008/0128230 A1* | 6/2008 | Or et al. | 188/267.2 |
| 2010/0163354 A1* | 7/2010 | Braun | 188/266.2 |
| 2010/0179730 A1* | 7/2010 | Hiemenz et al. | 701/45 |
| 2011/0133378 A1* | 6/2011 | Dunn | 267/217 |

\* cited by examiner

*Primary Examiner* — Anna Momper
*Assistant Examiner* — San Aung
(74) *Attorney, Agent, or Firm* — James L Farmer

(57) ABSTRACT

Designs and methods are provided for a hydraulic strut and control system suitable for energy attenuation applications such as vehicle seating system. In one exemplary embodiment the hydraulic strut includes a main cylinder having a first closed end, a second end with an opening. A main piston slidably disposed in the main cylinder divides it into a first fluid chamber between the main piston and the first end of the main cylinder, and a second fluid chamber between the main piston and the second end of the main cylinder. At least one fixed orifice through the piston provides fluid communication between the first and second fluid chambers. An integral flow control valve is adapted to vary the flow area of the at least one orifice through the piston. The flow control valve is operatively connected to a high speed actuator responsive to an electrical control signal.

20 Claims, 8 Drawing Sheets

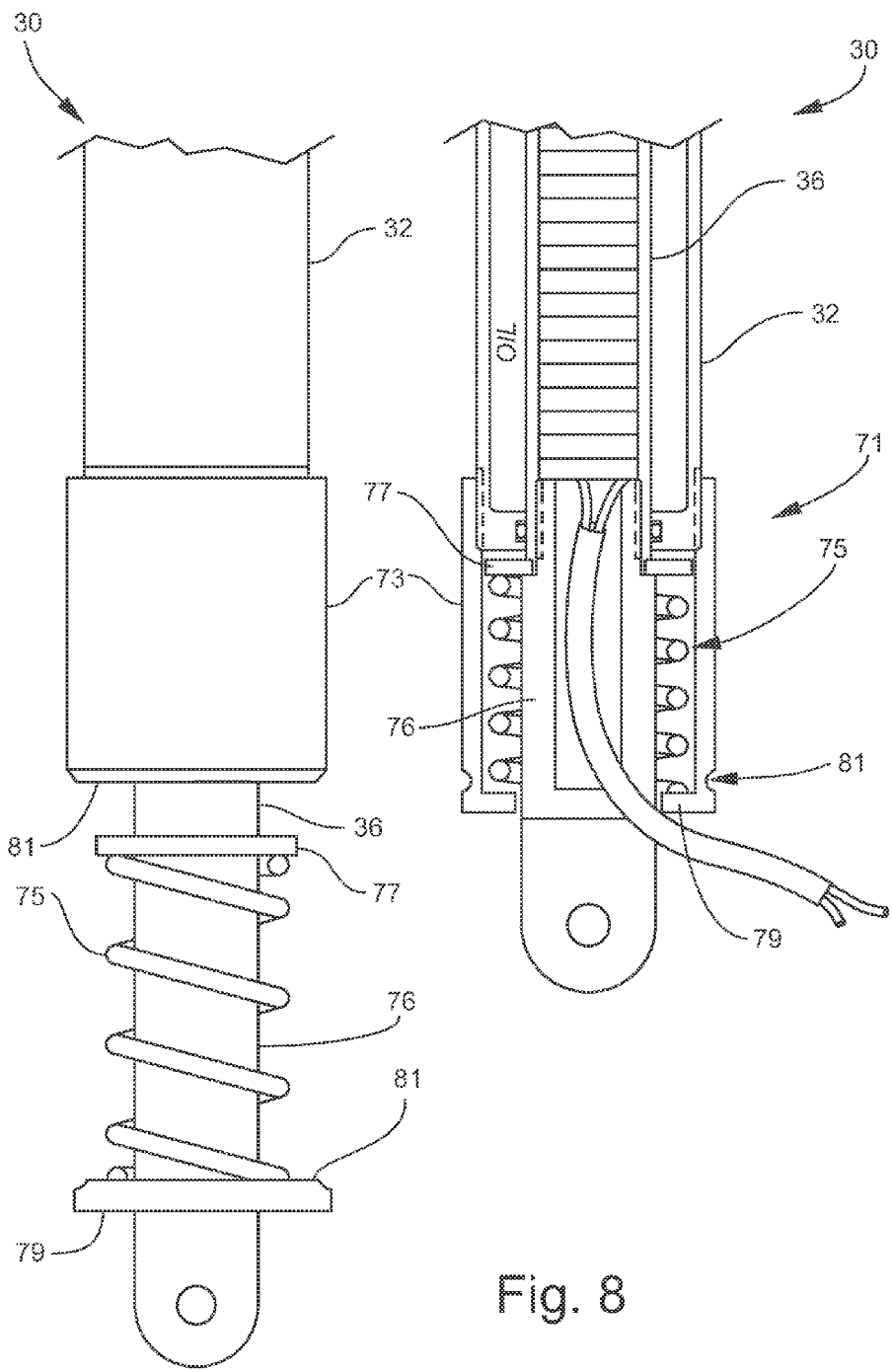

STRUT WITH ADAPTIVE ENERGY ATTENUATION

TECHNICAL FIELD AND BACKGROUND

The subject matter herein relates in general to safety devices and systems for providing protection against high energy shock loads, and in particular relates to safety devices which may be used in a vehicle for protecting an occupant disposed therein against compressive forces attributed to instantaneous, high-rate vehicle accelerations.

Instantaneous accelerations in the field encompass any event resulting in a high energy impulse imparted to a vehicle, such as may occur for example in a so-called "slam down" typically associated with a helicopter crash, or explosive events such as an under-vehicle mine blast. The resulting acceleration may involve the entire vehicle, or some portions of the vehicle to a greater degree than others. For example, an improvised explosive device may have an approximate fragment velocity of 950 m/s, which, when impacting a vehicle's outer surface, may cause significant localized deformation. Thus, in addition to acceleration of the vehicle as a whole, inward deformation of the vehicle itself also poses a threat to occupants situated therein.

Accordingly safety devices within the field may comprise devices intended to mitigate or reduce the amount of energy that is transmitted from the vehicle or from certain portions of the vehicle to the occupants. In particular, such safety devices may include those intended to reduce the amount of impact energy imparted through a seat to the torso and spine of a seated occupant.

BRIEF DESCRIPTION OF THE DRAWINGS

In the accompanying drawings:

FIGS. 7 and 8 show an adaptive energy attenuating strut with integral break-away spring assembly.

DESCRIPTION OF THE EMBODIMENTS

Figure 1:
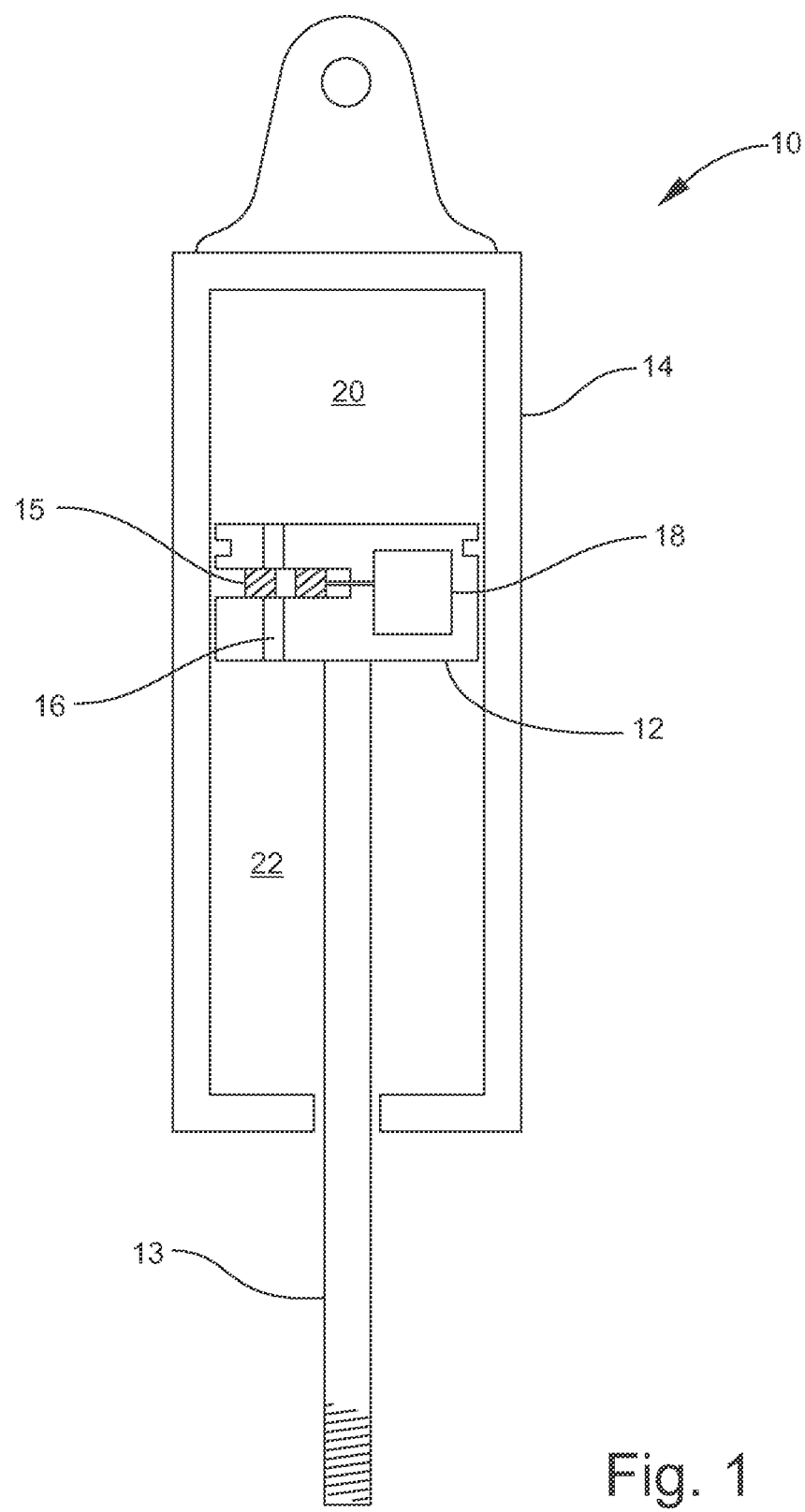
FIG. 1 is a schematic cut-away depiction of an exemplary adaptive energy attenuating strut in accordance with the present disclosure.

The instant invention is described more fully hereinafter with reference to the accompanying drawings and/or photographs, in which one or more exemplary embodiments of the invention are shown. This invention may, however, be embodied in many different forms and should not be construed as limited to the embodiments set forth herein; rather, these embodiments are provided so that this disclosure will be operative, enabling, and complete. Accordingly, the particular arrangements disclosed are meant to be illustrative only and not limiting as to the scope of the invention. Moreover, many embodiments, such as adaptations, variations, modifications, and equivalent arrangements, will be implicitly disclosed by the embodiments described herein and fall within the scope of the present invention.

Although specific terms are employed herein, they are used in a generic and descriptive sense only and not for purposes of limitation. Unless otherwise expressly defined herein, such terms are intended to be given their broad ordinary and customary meaning not inconsistent with that applicable in the relevant industry and without restriction to any specific embodiment hereinafter described. As used herein, the article "a" is intended to include one or more items. Where only one item is intended, the term "one", "single", or similar language is used. When used herein to join a list of items, the term "or" denotes at least one of the items, but does not exclude a plurality of items of the list.

For exemplary methods or processes of the invention, the sequence and/or arrangement of steps described herein are illustrative and not restrictive. Accordingly, it should be understood that, although steps of various processes or methods may be shown and described as being in a sequence or temporal arrangement, the steps of any such processes or methods are not limited to being carried out in any particular sequence or arrangement, absent an indication otherwise. Indeed, the steps in such processes or methods generally may be carried out in various different sequences and arrangements while still falling within the scope of the present invention.

Additionally, any references to advantages, benefits, unexpected results, or operability of the present invention are not intended as an affirmation that the invention has been previously reduced to practice or that any testing has been performed. Likewise, unless stated otherwise, use of verbs in the past tense (present perfect or preterit) is not intended to indicate or imply that the invention has been previously reduced to practice or that any testing has been performed.

Further, the term "vehicle" as used herein means any land, air, sea, or space vehicle, including for example cars, trucks, military land vehicles of all kinds, aircraft, helicopters, and any other mobile means for transporting people or other things from one place to another.

For convenience, the following conventions will be used herein to describe orientations and directions. Referring to the Cartesian coordinate axes where denoted on the drawing Figures, the word "vertical" and similar words generally refer to the Z axis directions; words such as "up", "upward", or "top" refer to the positive Z direction, or in the case of the floor of a vehicle compartment the direction away from and normal to the floor; words such as "down", "downward", or "bottom" refer to the negative Z direction, or in the case of a vehicle compartment, the direction toward the floor; words such as "front" and "back" refer to the Y axis directions; and words such as "lateral", "right", and "left" refer generally to the X axis directions. Other orientation or direction related words used herein but not listed above should be given their customary meaning not inconsistent with these conventions. Further, the association of words to particular coordinate axes is intended to provide general directions and orientations, and unless otherwise noted is not necessarily intended to require precise alignment with any coordinate direction.

Referring now specifically to the drawing figures, an exemplary energy attenuating strut is shown in FIG. 1, and indicated generally at reference numeral 10. Strut 10 comprises a cylinder 14 housing a sliding piston 12 and piston rod 13. The piston 12 separates the cylinder into a first chamber 20 and second chamber 22, with one or more of an orifice 16 extending through the piston 12 providing a fluid path between the cylinder chambers. It will be appreciated that the flow area of orifice 16 determines the amount of fluid damping resistance to movement of the piston 12 in cylinder 14.

A valve 15 and high speed actuator 18, located on, or integral with the piston 12 or piston rod 13, may be used to vary the flow area of the one or more orifice 16. In one embodiment the high speed actuator 18 is a piezoelectric device comprising, for example, a stack of piezoelectric wafers adapted to produce precise linear displacements in response to variations in applied voltage. The amount of available displacement is generally determined by the number of wafers in the stack, and the total length of the stack. Commercially available piezoelectric stack actuators are capable of deflections on the order of approximately 0.1 inch per inch of stack length. For example, a model PSt 150/20/190 VS25 encased low voltage stack actuator sold by APC International, Ltd., located in Mackeyville, Pa., is 217 mm in length, with a maximum stroke of 25 mm. Such devices may be conveniently combined with a linear motion valve, such as a gate valve or poppet valve, for controlling the area of the one or more orifice 16.

Figure 2:
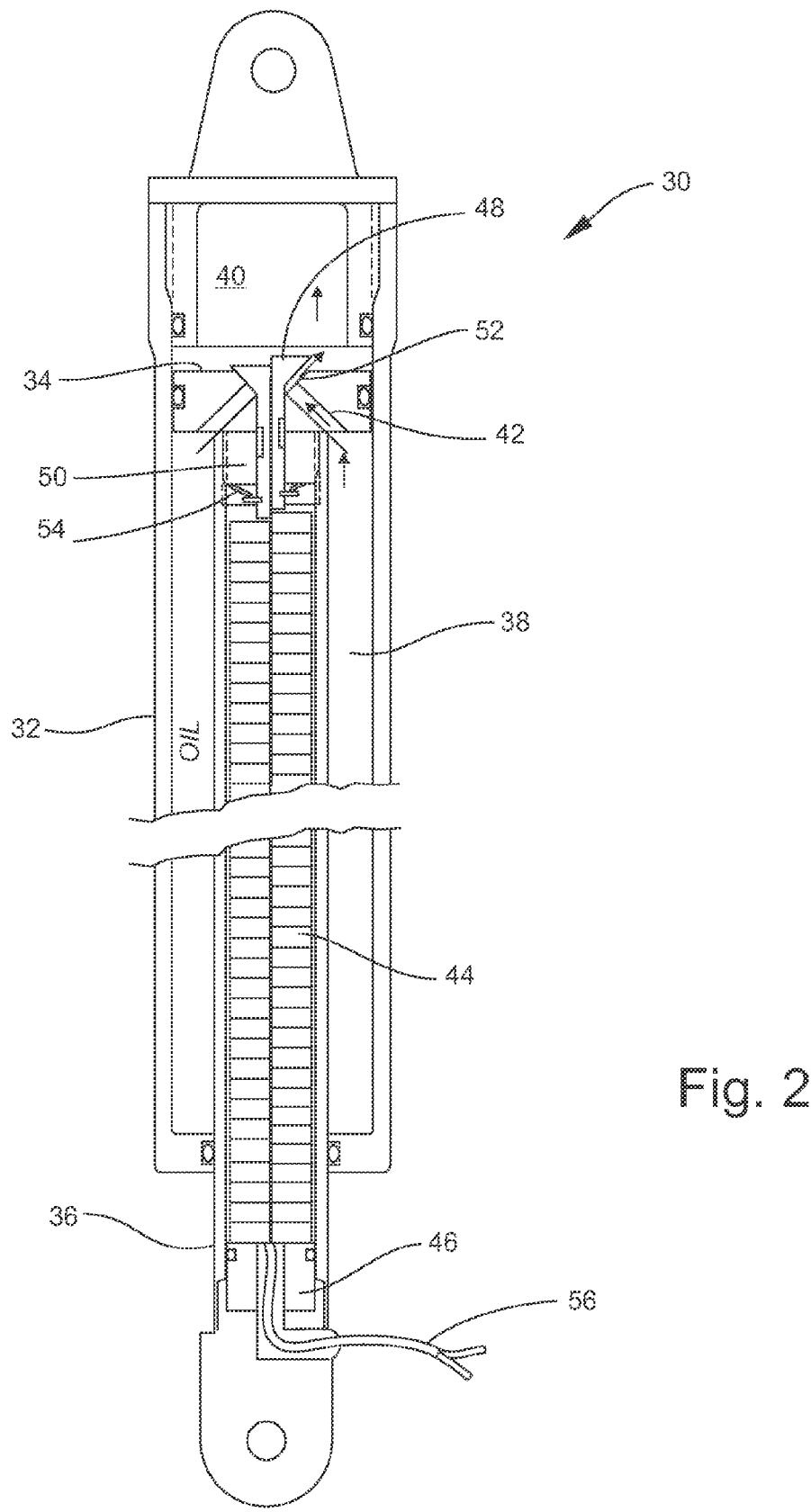
FIG. 2 is a two-sided cross section of an adaptive energy attenuating strut with a poppet type flow control valve driven by a stacked piezoelectric wafer actuator.

FIG. 2 illustrates another embodiment of an exemplary energy attenuating strut in accordance with the present disclosure, indicated generally at reference numeral 30. Strut 30 comprises a main cylinder 32, a main piston 34 slidably received inside the main cylinder 32, and a piston rod 36 extending from main piston 34 and out through the bottom of cylinder 32. The main piston 34 divides the main cylinder 32 into a first fluid chamber 38 below the piston between the piston rod 36 and inner wall of the main cylinder 32, and a second fluid chamber 40 above main piston 34. At least one orifice 42 extending through piston 34 provides a fluid path between the first and second fluid chambers 38, 40.

The piston rod 36 is itself a hollow cylinder, the inside of which contains an elongated stack of piezoelectric wafers 44 that extend from a plug 46 at the bottom end of piston rod 36 to a point below piston 34 at the upper end. Actuator power wires 56 enter the piston rod 36 through plug 46 and connect to the piezoelectric wafers 44. The piezoelectric wafers 44 are free to slide vertically within the piston rod 36 when expanding and contracting in response to voltage changes. A linear motion type flow control valve 48 extends from the upper end of the stack of wafers 44 through a bore 50 in piston 34. The valve 48 is configured to engage orifice 42 such that vertical motion of the valve 48 varies the available flow area through piston 34. In the particular embodiment of FIG. 2, the valve 48 is a poppet type valve, with bore 50 in piston 34 acting as a guide for a stem portion of the valve, and a beveled recess 52 in the upper end of bore 50 serving as a seat for the valve head. The orifice 42 is at an angle, extending between the beveled recess 52 at one end, and the lower end of piston 34 at the other end.

It should be noted that FIG. 2 is a composite drawing split vertically down the center, with the right and left halves showing the piezoelectric stack and valve 48 in two positions. Specifically, the left half of FIG. 2 shows the piezoelectric stack in a contracted condition with the valve 48 all the way down against the seat 52, while the right side shows the piezoelectric stack in an extended condition, with valve 48 forced up away from seat 52. A valve spring 54 disposed about the stem portion of valve 48 below piston 34 biases the valve downward against the top of the piezoelectric wafer stack.

In operation, a calibrated voltage is applied to wafers 44 via wires 56 causing the wafers to expand. The amount of expansion is proportional to the voltage. Plug 46 prevents movement of the lower end of the wafer stack, thus all of the wafer expansion is realized as an upward linear deflection at the free, upper end. Conversely reducing the applied voltage causes the wafer stack to contract, resulting in a downward linear deflection at the upper end. Valve spring 54 is designed such that the downward bias of the spring can be easily overcome by the upward force exerted from an expanding wafer stack. Thus as the wafer stack expands and valve 48 is pushed upward away from seat 52, orifice(s) 42 becomes unblocked, allowing fluid to flow across piston 34 through the gap between the valve 48 and valve seat 52. The resistance to fluid flow can be varied between the two extremes of zero flow, with the valve seated, and the maximum unrestricted flow allowed by orifice(s) 42 with the valve sufficiently displaced. The amount of flow resistance across piston 34 can thus be directly controlled by varying the voltage applied to piezoelectric wafers 44.

Figure 3:
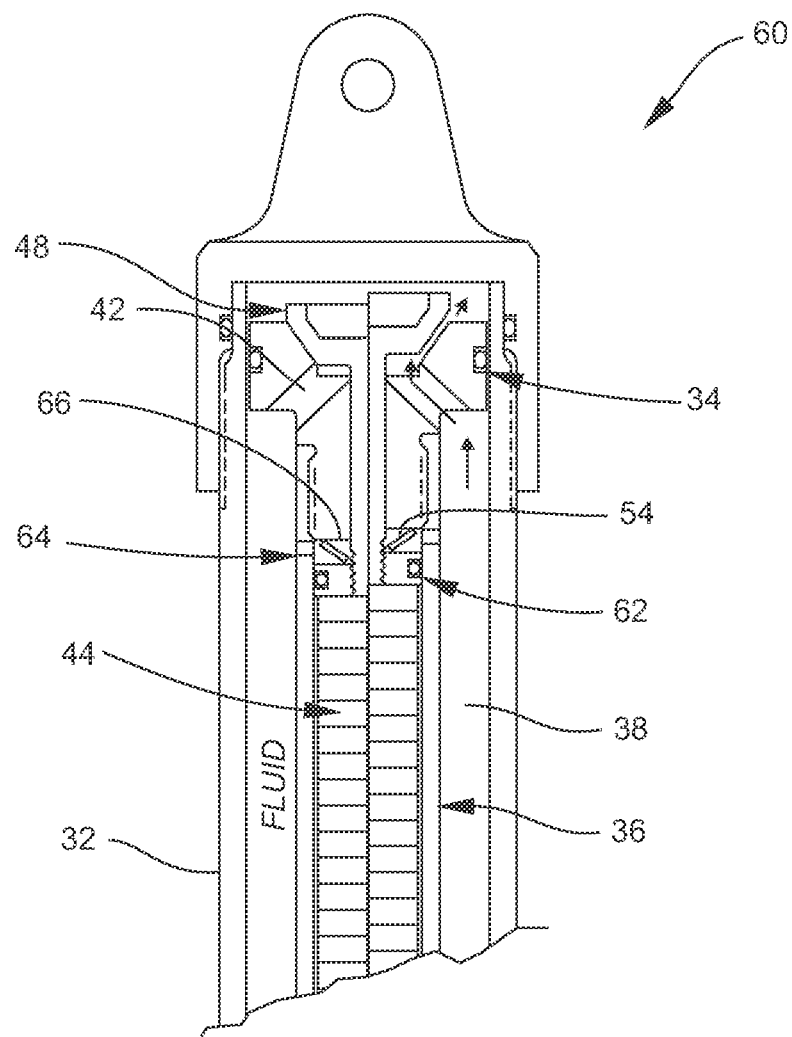
FIG. 3 depicts another embodiment of the valve portion of the strut shown in FIG. 2 with a balance piston atop the piezoelectric wafer actuator.

FIG. 3 depicts a variation of the energy attenuating strut of FIG. 2, indicated generally at reference numeral 60. In addition to the elements of strut 30, strut 60 further comprises a balance piston 62 attached to control valve 48 directly atop the wafer stack. When the piston rod 36 is pulled downward by an external force, the pressure in chamber 38 below the piston 34 increases relative to the pressure above the piston. The increased pressure vents through orifice(s) 42 to the bottom of valve 48, creating an upward pressure load on the valve, and consequently an upward load on the piezoelectric stack 44. A cavity 66 between the balance piston 62 and bottom of the main piston 34 is also vented to the first fluid chamber 38, via vent holes 64 in the wall of piston rod 38. Vent holes 64 allow the pressure in cavity 66 to equalize with the pressure in chamber 38, thus applying a downward force on the balance piston 62 due to the increased relative pressure. The downward force on the balance piston 62 counteracts the upward pressure force exerted on valve 48 at the valve seat 52, and tends to prevent the upward pressure force from overcoming spring 54 and opening the valve more than desired.

The energy attenuating struts of the present disclosure may be operated as either extension or compression devices, and coupled with a suitable spring to create a spring-damper system for supporting a vehicle seat. The spring may be a part of the strut, such as in a typical automobile spring strut that incorporates a coil compression spring surrounding the strut, or external to the strut, such as in an automobile suspension of the type using a shock absorber and separate coil or leaf spring. In an EA seat application, a spring and strut system may be mounted between the seat and seat supporting structure such that a downward stroke of the seat compresses or extends the strut and spring.

Figure 4:
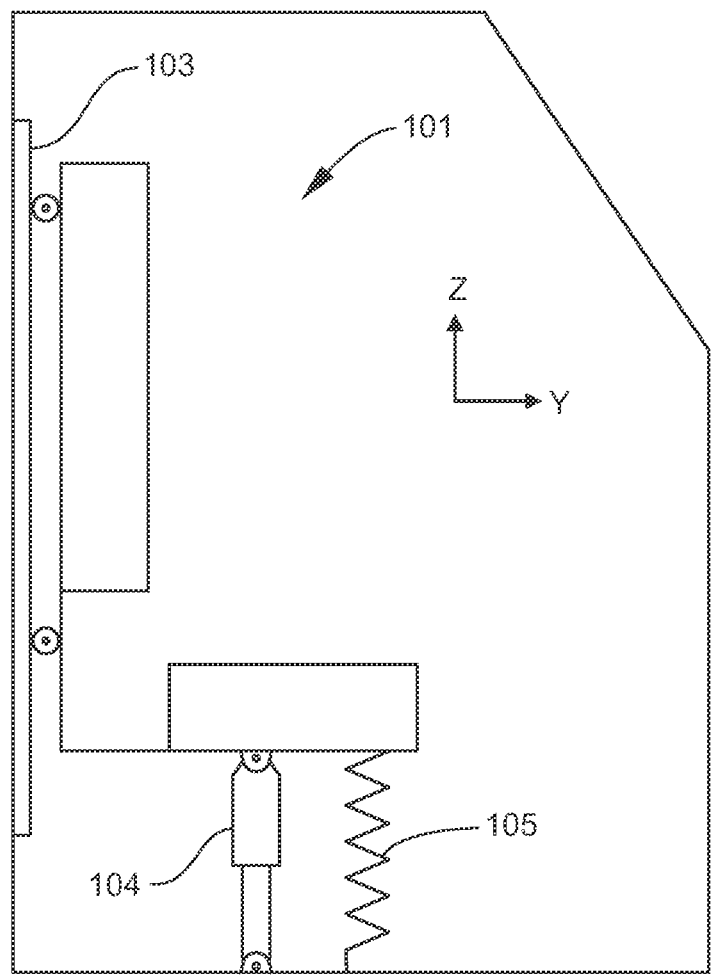
FIG. 4 is a side elevation of an exemplary energy attenuating seat system comprising a seat supported by an adaptive energy attenuating strut and a spring.

A schematic representation of an EA seat supported by an exemplary compression spring and strut system is shown in FIG. 4. Seat 101 is guided along a support structure or track 103 that allows the seat to freely move in a vertical direction. A strut 104, and a compression spring 105 are mounted between the seat and the floor. Although depicted as separate elements, the strut and spring could alternatively comprise one integrated component such as the above described automotive spring strut. The strut 104 is a variable damping, fast reacting strut such as those shown and described above in reference to FIGS. 1 through 3. When the seat is unloaded, spring 105 biases the seat upward, and the strut 104 toward a fully extended condition. During vehicle operation, the downward load of the seat occupant is supported by the spring 105.

For normal operation the valve in strut 104 may be positioned to provide a suitable level of damping in conjunction with spring 105 such that shock loads are largely absorbed, and seat deflections are relatively small. Conversely for a high energy impact event, the valve in strut 104 can be adjusted to a substantially more open position such that most or all the energy is absorbed in one downward stroke of the seat. The length of the seat stroke and the peak reaction force in that case may be many multiples of those experienced during normal operation.

Figure 5:
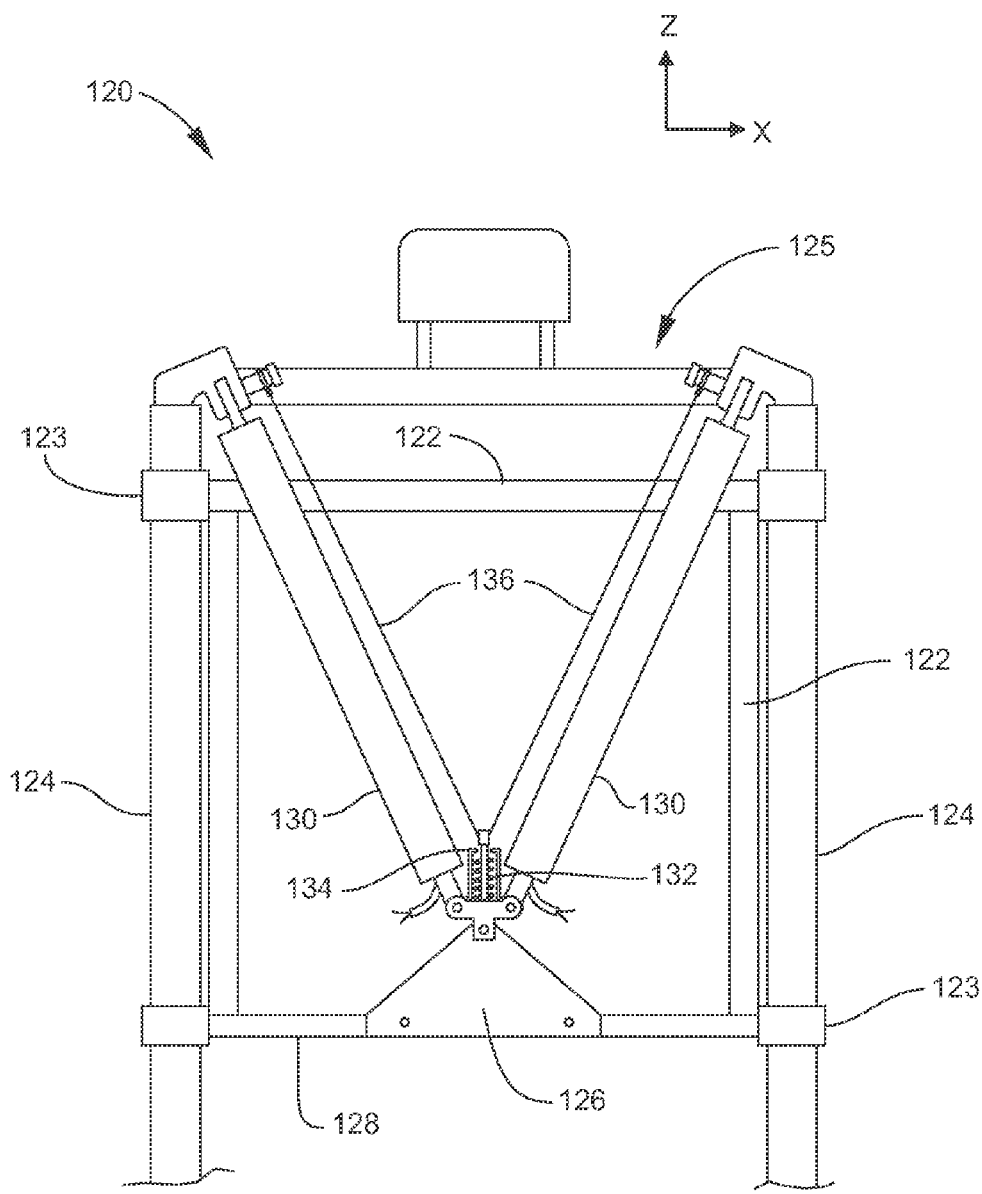
FIG. 5 is a back view of an energy attenuating seating system comprising a sliding seat supported by two adaptive energy attenuating struts and a break-away spring assembly.

Referring now to FIG. 5, another embodiment of an EA seat assembly 120 with an extension strut and spring system is illustrated. A seat 122 is slidably mounted to a pair of spaced apart tubular posts 124 of a seat frame 125 via bushings 123. A pair of extension struts 130 are disposed between the top of frame 125 and a central seat support bracket 126 connected to a bottom member 128 of seat 122. As can be seen, when the seat 122 slides downward on seat supports 124, the seat support bracket 126 goes with it, simultaneously extending both struts 130.

The seat 122 is prevented from sliding downward under normal circumstances by a spring connected to the support bracket 126. The spring may for example be a compression spring extending downward to the floor, or a tension spring extending upward to the top of the seat frame, integral with or separate from struts 130. In the embodiment depicted in FIG. 5, the spring is a relatively short compression spring 132 in a spring assembly 134 that is supported by cables 136 attached to seat frame 125 adjacent the connection points of struts 130. Referring to the more detailed view of FIG. 6, the spring assembly 134 includes a cage 137 that extends up and over the top of spring 132, trapping it against bracket 126. A plate 138 between the spring 132 and bracket 126, is connected to a shear pin 140 that extends up through spring 132 and cage 137. The shear pin 140, plate 138, and cables 136 support the spring 132 in space relative to the seat 122 and bracket 126. When the seat strokes downward, the bracket 126 and cage 137 move downward with it, compressing spring 132 as the space between the top of the cage 137 and the fixed plate 138 decreases.

Figure 6:
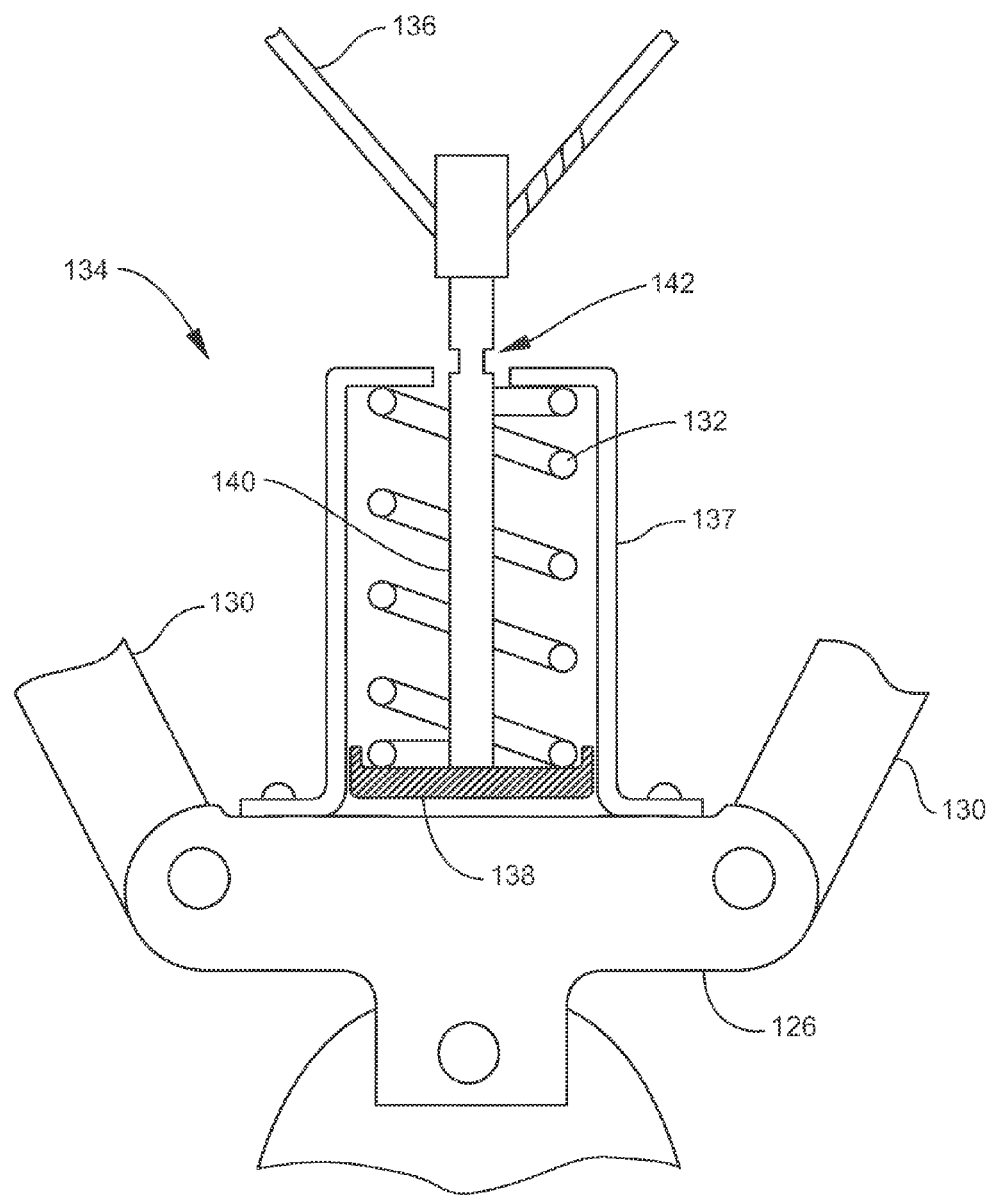
FIG. 6 is a close up view of the break-away spring assembly of FIG. 5.

The length and stiffness of the spring 132 may be optimized to provide an appropriate level of support for absorbing shock loads associated with normal conditions. For substantially higher shock loads, such as those that may associated with a mine blast or slam down event, the spring assembly 134 may include a break-away feature that releases the spring, allowing the seat and struts to stroke unrestrained by the spring. The break-away feature may for example comprise a mechanical fuse in the form of a weak point in the structure designed to fail when the downward load applied by the seat exceeds a design threshold value. In the embodiment of FIGS. 5 and 6, the mechanical fuse comprises a simple notch 142 in shear pin 140. The notch 142 is sized such that shear pin 140 can support a range of g-loads associated with normal operation indefinitely, but fail by stress rupture at notch 142 when the tensile loading exceeds some designated factor above the normal load range.

FIGS. 7 and 8 depict another embodiment of an energy attenuating strut in accordance with the present disclosure that incorporates an integral spring assembly 71 with an alternative version of a break-away feature. The spring assembly 71 is built onto the lower end of an energy attenuating strut 30 of the type described above in reference to FIG. 2. In this embodiment the strut is again configured to operate as a tension member, with spring assembly 71 resisting extension loads applied to the end of the piston rod. Spring assembly 71 comprises a spring housing 73 attached to the strut main cylinder 32, and a compression spring 75 inside the housing. The spring 75 is disposed around an elongated piston rod plug 76 between a washer 77 attached to piston rod 36 above the spring, and an inwardly projecting shelf 79 at the bottom of the housing 73. Thus in order to extend the piston rod 36 from main cylinder 32, the spring 75 must be compressed.

The effective range of strut operation is determined by the useable compression range of spring 75. Thus for example, when supporting a seat in a vehicle or aircraft, the spring assembly 71 may be configured to absorb shock and vibration loads at levels anticipated for normal operation without bottoming out the spring 75. The break-away feature of the present embodiment comprises a designed-in weak point in the form of a simple notch 81 circumscribing the spring housing 74 just above the shelf 79. FIG. 8 depicts the lower end of the strut as it would appear with the spring housing 73 sheared off at notch 81, thereby releasing the spring and allowing the piston rod 36 to stroke downward, restrained only by the damping force of the strut.

Operation of energy attenuating strut of the present disclosure may be divided generally into two modes: an adaptive mode for attenuation of high energy shock loads; and a normal mode for controlled passive viscous damping. A control system comprising primarily an electronic controller and various sensors, is used to operate the high speed actuator and flow control valve in the different modes. The control system is also useable to select a control mode for use at any point in time based on sensor input or other information.

The control system will default to normal mode when sensor derived acceleration levels are not indicative of the onset of a high energy impact event. The sensors may include for example accelerometers, pressure sensors, and the like, mounted to the vehicle structure or the seat. While in normal mode, the controller will adjust flow control valve area based on factors such as occupant weight, acceleration ranges, and floor vibration spectrum, using a load mitigation algorithm designed for the particular installation. The flow control valve will generally be positioned to provide a relatively small flow opening that is modulated as required to optimize viscous damping, and minimize the transmission of shock and vibration to the seat pan and occupant. Valve position may be updated as required, or at regular intervals according to the load mitigation algorithm.

For the adaptive mode, the high speed actuator and flow valve are generally operated to produce relatively large flow openings, up to a maximum flow area allowed by the fixed flow orifices in the piston. This requirement determines the maximum actuator travel, which in turn determines the necessary height of the piezoelectric wafer stack. A high energy impulse event may be detected from sensor input, such as acceleration and pressure sensor input, using an impulse detection algorithm in the controller. Upon detection of a high energy impulse event, the controller will rapidly adjust the flow control valve area in real time to optimize energy attenuation, or to minimize acceleration experienced by the occupant.

Real time adjustments may be based on a proportional integral derivative ("PID") algorithm using a closed loop in which data such as seat acceleration, seat velocity, and strut force are monitored real time. The real time sensor data is used to adjust the flow control valve to track a desired force or acceleration profile during the event. Modeling imperfections or unforeseen mechanical effects that may be acting on the seat or occupant are corrected for by the closed loop system. For example, in one embodiment the seat stroking velocity is monitored, and the controller progressively closes the strut flow control valve as the velocity decreases during the event.

By basing valve position on stroking velocity, the stroking load can be maintained constant throughout the impulse event, allowing for maximum energy attenuation and strut efficiency. Maintaining a constant load may be highly beneficial where available stroking distance is limited. Alternatively where space is less of a concern, it may be advantageous to instead base valve closure rate on acceleration to minimize potential for occupant injury.

In the case of an aircraft or helicopter application, the adaptive mode may further comprise a crash prediction algorithm. Using sensor data, the valve opening may be preset to a predicted optimized initial value immediately prior to high energy impulse event. For example, an initial flow control valve area may be selected from a lookup table based on relevant information such as occupant weight (measured with strain gauges, pressure sensors, or supplied externally), and aircraft sensor inputs. Such a lookup table may be created from crash prediction data derived from simulation runs over the range of possible parameter values.

Figure 9:
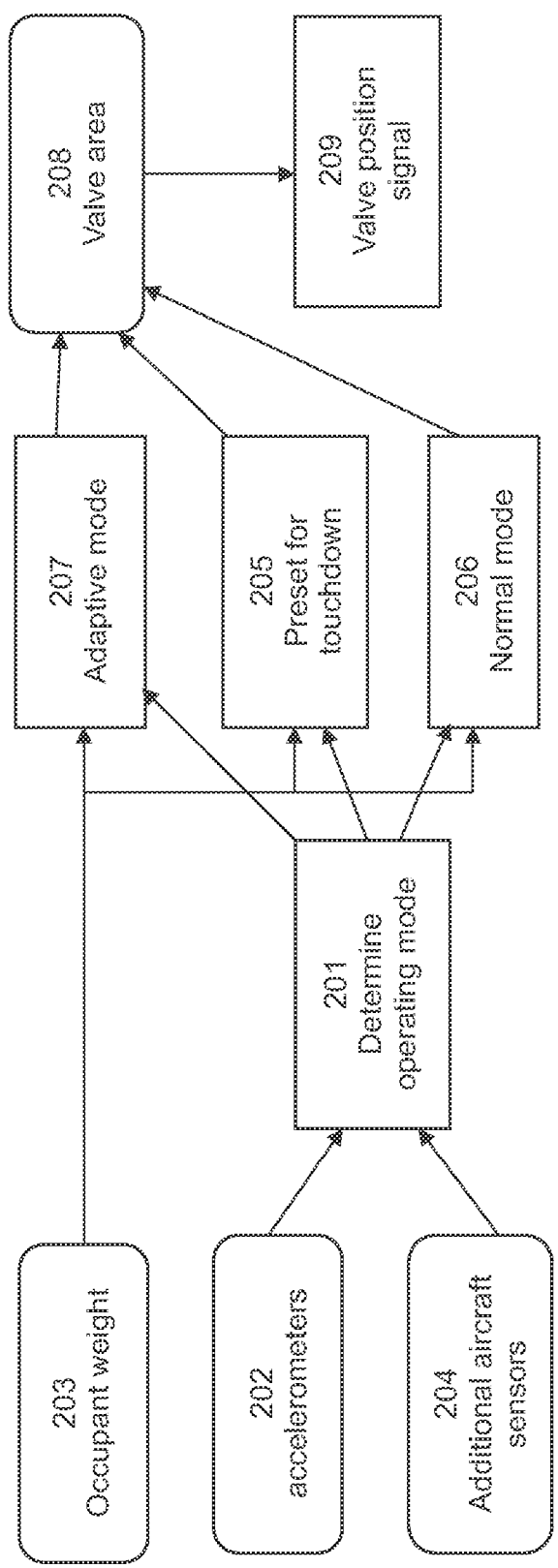
FIG. 9 is a numbered block diagram of an exemplary process for selecting an operating mode and adjusting the flow control valve of an adaptive energy attenuating strut.

In FIG. 9 a numbered block diagram is used to illustrate an exemplary process for selecting an operating mode and adjusting the flow control valve of an adaptive energy attenuating strut. With reference to the block numbers, an operating mode 201 may be selected using sensor input such as accelerometers 202, or additional aircraft sensors 204. The input from aircraft sensors 204 may include data such as descent rate and height over ground, and may come from dedicated sensors or existing aircraft instruments where feasible. Operating mode options include a "preset for touchdown" mode 205, normal mode 206, and adaptive mode 207. Using the sensor input and operating mode information, a valve flow area 208 is determined, and from that a valve position signal 209 is generated.

For the purposes of describing and defining the present invention it is noted that the use of relative terms, such as "substantially", "generally", "approximately", and the like, are utilized herein to represent an inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

Exemplary embodiments of the present invention are described above. No element, act, or instruction used in this description should be construed as important, necessary, critical, or essential to the invention unless explicitly described as such. Although only a few of the exemplary embodiments have been described in detail herein, those skilled in the art will readily appreciate that many modifications are possible in these exemplary embodiments without materially departing from the novel teachings and advantages of this invention. Accordingly, all such modifications are intended to be included within the scope of this invention as defined in the appended claims.

In the claims, any means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. Unless the exact language "means for" (performing a particular function or step) is recited in the claims, a construction under §112, 6th paragraph is not intended. Additionally, it is not intended that the scope of patent protection afforded the present invention be defined by reading into any claim a limitation found herein that does not explicitly appear in the claim itself.

What is claimed is:

1. An energy attenuating vehicle seat system, comprising:
    a seat mounted for guided motion relative to a seat supporting structure along a substantially vertical axis;
    a hydraulic strut disposed between the seat and the seat supporting structure, the hydraulic strut incorporating a high speed actuator adapted to modulate a strut damping valve;
    a compression spring configured to support the weight of a seated occupant during normal vehicle operation, wherein the spring is securely disposed between a fixed end member underneath the spring that is connected to the seat supporting structure, and a moveable end member atop the spring that moves toward the fixed end member when the seat moves downward relative to the seat supporting structure, whereupon the spring is compressed between the fixed and moveable end members; and
    a break-away feature between the fixed end member and the seat supporting structure that is configured to fail when a compressive force applied to the spring exceeds a threshold value, whereupon further downward motion of the seat is no longer resisted by the spring.

2. The energy attenuating vehicle seat system of claim 1, wherein the break-away feature is a mechanical fuse in a structural member connecting the fixed end member to the seat supporting structure.

3. The energy attenuating vehicle seat system of claim 2, wherein the mechanical fuse is a notch in the structural member.

4. The energy attenuating vehicle seat system of claim 1, wherein the high speed actuator comprises a stack of piezoelectric wafers, and the strut damping valve is a poppet valve.

5. The energy attenuating vehicle seat system of claim 1, further comprising a controller operatively connected to the actuator and adapted to utilize input from sensors.

6. The energy attenuating vehicle seat system of claim 5, wherein the controller is operable in a normal mode during normal vehicle operation and seat loading conditions, and a high energy mode upon detection of a high energy impulse event.

7. The energy attenuating vehicle seat system of claim 6, wherein the controller provides a first signal to the hydraulic strut during normal mode operation that is calculated to minimize the transmission of shock and vibration to a seated occupant, and a second signal to the hydraulic strut upon detection of a high energy event that is calculated to optimize energy attenuation, and minimize acceleration experienced by the seated occupant.

8. The energy attenuating vehicle seat system of claim 7, wherein the controller incorporates an algorithm adapted to select an operating mode using data from the sensors.

9. The energy attenuating vehicle seat system of claim 8, wherein the algorithm is further adapted to optimize energy attenuation in a high energy impulse event by using sensor data to adjust the strut damping valve in real time.

10. The energy attenuating vehicle seat system of claim 5, wherein the controller operates in normal mode when the compression spring is intact, and in high energy mode when the compression spring has failed.

11. An energy attenuating vehicle seat system, comprising:
    a seat mounted for guided motion relative to a seat supporting structure along a substantially vertical axis;

a hydraulic strut connected at one end to the seat and the other end to the seat supporting structure;

a coil spring configured to support the weight of a seated occupant during normal vehicle operation, wherein the coil spring is securely disposed between a fixed end member at one end of the spring that is connected to the seat supporting structure, and a moveable end member at the other end of the spring that is connected to the seat; and a break-away feature between the fixed end member and the seat supporting structure that is configured to fail when a force applied to the coil spring due to downward motion of the seat exceeds a threshold value, whereupon further downward motion of the seat is no longer resisted by the coil spring.

12. The energy attenuating vehicle seat system of claim 11, wherein the hydraulic strut incorporates a high speed actuator adapted to modulate a strut damping valve in response to a signal from a controller.

13. The energy attenuating vehicle seat system of claim 12, wherein the high speed actuator comprises a stack of piezoelectric wafers, and the strut damping valve is a poppet valve.

14. The energy attenuating vehicle seat system of claim 12, wherein the controller incorporates an algorithm adapted to select an operating mode using data from the sensors.

15. The energy attenuating vehicle seat system of claim 14, wherein the controller is operable in a normal mode when data from the sensors indicates normal vehicle operation and seat loading conditions, and a high energy mode when data from the sensors indicates a high energy impulse event.

16. The energy attenuating vehicle seat system of claim 15, wherein the controller provides a first signal to the hydraulic strut during normal mode operation that is calculated to minimize the transmission of shock and vibration to a seated occupant, and a second signal to the hydraulic strut upon detection of a high energy impulse event that is calculated to optimize energy attenuation.

17. The energy attenuating vehicle seat system of claim 16, wherein the algorithm is further adapted to optimize energy attenuation in a high energy impulse event by using sensor data to adjust the strut damping valve in real time.

18. The energy attenuating vehicle seat system of claim 11, wherein the break-away feature is a mechanical fuse in a structural member connecting the fixed end member to the seat supporting structure.

19. The energy attenuating vehicle seat system of claim 18, wherein the mechanical fuse is a notch in the structural member.

20. An energy attenuating vehicle seat system, comprising:

a seat mounted for guided, substantially vertical motion on a fixed seat frame;

a hydraulic strut connected at one end to the seat and at another end to the seat frame;

a spring disposed between the seat and seat frame configured to support the weight of a seated occupant during normal vehicle operation; and a break-away feature between the spring and the seat frame that is configured to fail when a force applied to the spring due to downward motion of the seat exceeds a threshold value, whereupon the spring no longer resists further downward motion of the seat.

\* \* \* \* \*